United States Patent
Spies et al.

(10) Patent No.: US 6,230,269 B1
(45) Date of Patent: May 8, 2001

(54) DISTRIBUTED AUTHENTICATION SYSTEM AND METHOD

(75) Inventors: Terence R. Spies, Kirkland; Pradyumna K. Misra, Redmond, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/036,001

(22) Filed: Mar. 4, 1998

(51) Int. Cl.[7] .............................. H04L 9/32; H04L 9/08; H04L 9/30

(52) U.S. Cl. .................. 713/182; 380/279; 380/282; 713/171

(58) Field of Search ............................ 713/182, 183; 380/1, 44, 46, 47, 28, 30, 277, 278, 279, 281, 282, 283, 284, 285

(56) References Cited

U.S. PATENT DOCUMENTS

| | | | |
|---|---|---|---|
| 5,199,070 | * 3/1993 | Matsuzaki et al. | 380/30 |
| 5,712,912 | * 1/1998 | Tomko et al. | 380/23 |
| 5,787,169 | * 7/1998 | Eldridge et al. | 380/4 |
| 6,018,581 | * 1/2000 | Shona et al. | 380/46 |

FOREIGN PATENT DOCUMENTS 3-82239 * 4/1991 (JP) .................. H04L/9/18

OTHER PUBLICATIONS

C. Kaufman et al., "Network Security: Private Communication in a Public World," Prentice Hall, 1995, pp. 185–186 and 209–211.*

Translation into English of "Encryption Key Delivery System," Okamoto et al., Japanese Pat. No. 3–82239, Apr. 8, 1991, pp. 1–9, 266, 267.*

A.J. Menezes et al., "Handbook of Applied Cryptography," CRC Press, Oct. 16, 1996, pp. 15–17, 388–389, 493–495, and 506–507.*

* cited by examiner

Primary Examiner—Tod Swann
Assistant Examiner—Justin T. Darrow
(74) Attorney, Agent, or Firm—Lee & Hayes, PLLC

(57) ABSTRACT

An authentication system for a distributed network having multiple clients and a server enables a user to log on at any one of the clients with a password and receive his/her associated public/private key pair. The client computes a hash of the user ID to produce a first hash value H(ID) and a hash of the user ID concatenated with the user password P to produce a second hash value H(ID/P). The client constructs a message M containing the hash value H(ID), the hash value H(ID/P), and a randomly generated session key SK. The client encrypts the message M using the server's public key and sends the encrypted message to the server. The server decrypts the message using its private key to recover the message M. The server initially checks to see if the hash values are subject to a hostile cryptographic attack. If the check is negative, the server generates key source material S as a function of the hash value H(ID), the hash value H(ID/P), and a private value that is confidential to the server. The server encrypts the key source material S using the session key SK received in the message M and sends the encrypted key source material S to the client. The client decrypts the key source material using the session key SK to recover the key source material S. The client then constructs a public/private key pair unique to the user from the user ID, the user password, and the key source material S. More particularly, one implementation involves passing the hash value H(ID), the hash value H(ID/P), the raw password P, and the key source material S through a random number generator to produce two large, relatively prime numbers p and q which are used in an RSA public key system to generate a public/private key pair.

62 Claims, 3 Drawing Sheets

DISTRIBUTED AUTHENTICATION SYSTEM AND METHOD

TECHNICAL FIELD

This invention relates to electronic, computer-based authentication systems and methods. More particularly, this invention relates to distributed cryptographic authentication systems implemented on distributed computer networks having one or more servers interconnected to one or more clients.

BACKGROUND OF THE INVENTION

Authentication systems are used in computer systems to verify participants. For example, when a user logs into a computer (or ATM, etc.), an authentication system enables the computer to verify the identity of the user. Similarly, when a user is sending messages across an open network, the authentication system helps the recipient verify that the message truly originated from the user (and not an impostor) and was not subsequently altered.

One conventional authentication system is based on use of passwords or PINs (personal identification numbers). A user enters a password and the computer compares the password with a stored list of passwords. The computer permits access if the user supplied password matches the password stored at the system. The security of a password system is based on the premise that only the user knows his/her password. However, the password system must maintain a list of valid passwords on a storage disk that can be easily copied or physically stolen.

To mitigate the threat of theft, an improvement of the password system is to compute a one-way function of the password and store only those values. A list of passwords operated on by a one-way function is less useful to a thief because the one-way function cannot be reversed to recover the original passwords. Unfortunately, these lists are vulnerable to dictionary attacks, in which an attacker systematically guesses common passwords and operates on the guessed passwords with the one-way function. The results are compared to the list of passwords to determine if there are any matches. Dictionary attacks can be conducted very efficiently and comprehensively using computers.

Aspects of this invention are particularly concerned with authentication systems implemented on distributed computer networks having multiple clients and servers. In this context, it is desirable for an authentication system to accommodate both point-of-access authentication and authentication between participants who communicate over the network. Typically, participant authentication is achieved through use of cryptographic public key systems. Each participant has a unique private key that is kept secret and a corresponding public key that is published for all to know. The public/private key pair can be used to encrypt and decrypt messages bound for the participant, or to digitally sign messages on behalf of the participant, or to verify the participant's signature. Oftentimes, a participant might have several public/private key pairs for different cryptographic functions, including one key pair for encryption/decryption functions and one key pair for signing functions.

In a distributed network system, a user's private key is conventionally stored in the memory of the user's client computer. The user authenticates messages and performs other cryptographic functions from his/her personal machine using the private key. This poses a problem for a distributed network architecture because the user is restricted to his/her own computer. Ideally, the authentication system should permit a user to roam from machine to machine without losing the ability to access his/her private key(s), thereby enabling the user to perform cryptographic functions from any machine as if that machine was the user's own.

One conventional approach to a distributed authentication system is to encrypt each user's private key with that user's password and to store all encrypted keys at a centralized, publicly accessible server. To retrieve the private key, the user simply enters a password on any client computer. The encrypted key is fetched from the server and decrypted with the password. This prior art system has two significant drawbacks. First, an attacker can eavesdrop on the network and record the encrypted key as it is passed from the server to the client. The attacker can then perform an off-line dictionary attack on the encrypted key. A second drawback is that a publicly accessible server is required to maintain a large database of encrypted private keys, which provides a security weakness if the database is ever compromised. The threat becomes greater since this machine must be highly available online, increasing chances for attack.

Another approach is to store the user's private key on a secure portable device, such as a smart card. The user carries the smart card from machine to machine. At any particular machine, the user can insert his/her smart card into a card reader to perform log on. The smart card manages the private keys and prevents them from leaving the card in their raw form. This approach has two main drawbacks. The first drawback is that the cards are expensive. The second drawback is one of inconvenience, as the user is required to carry the smart card everywhere. Furthermore, since the majority of systems today do not have smart card readers, this approach is impractical in the short term.

Accordingly, there is a need for a distributed authentication system for a computer network which enables users to roam freely from machine to machine on the network and to regenerate their cryptographic key pairs at any one of the computers using only their password, without suffering from the drawbacks described above.

SUMMARY OF THE INVENTION

This invention concerns a distributed authentication system for a computer network that allows a widely dispersed cluster of computers and systems to use the same authentication framework. The authentication system enables users to roam freely about the workstations or other computers on the network and to regenerate their cryptographic key pairs at any one of the computers using only their password. The authentication system eliminates reliance on portable key transports (e.g., smart cards) and centralized private key databases.

One aspect of the invention concerns a method for operating an authentication system on a distributed network having a client and a server. The user enters a password and a user ID at one of the client machines. The client is loaded with cryptographic services that perform various cryptographic functions, such as hashing, encryption, decryption, digital signing, and signature verification. The client computes a one-way hash function of the user ID to produce a first hash value H(ID) and a one-way hash function of the user ID concatenated with the user password P to produce a second hash value H(ID/P). The client constructs a message M containing the hash value H(ID), the hash value H(ID/P), and a randomly generated session key SK. The client saves the session key SK locally. The client encrypts the message M using the server's public key and sends the encrypted message to the server.

The server decrypts the message using its private key to recover the message M. The server initially checks to see if the hash values H(ID) or H(ID/P), which are indicative of the user ID or password, is subject to any hostile cryptographic attack. This is accomplished through preset policies aimed at rooting out malicious activity. If the check is affirmative, the server denies the request for key source material used to generate the user's private key. If the check is negative, the server generates key source material S as a function of the hash value H(ID), the hash value H(ID/P), and a private value that is confidential to the server. The server encrypts the key source material S using the session key SK received in the message M and sends the encrypted key source material to the client.

The client decrypts the key source material using the session key SK to recover the key source material S. The client then constructs a public/private key pair unique to the user from the user ID, the user password, and the key source material S. One implementation involves passing the hash value H(ID), the hash value H(ID/P), the raw password P, and the key source material S through a random number generator to produce two large, relatively prime numbers p and q. These prime numbers are used in an RSA public key system to generate a public/private key pair.

DETAILED DESCRIPTION OF THE PREFERRED EMBODIMENT

The following discussion assumes that the reader is familiar with cryptography techniques. For a basic introduction of cryptography and random number generation, the reader is directed to a text written by Bruce Schneier and entitled, "Applied Cryptography: Protocols, Algorithms, and Source Code in C," published by John Wiley & Sons with copyright 1994. A second edition of this book has been published more recently.

Figure 1:
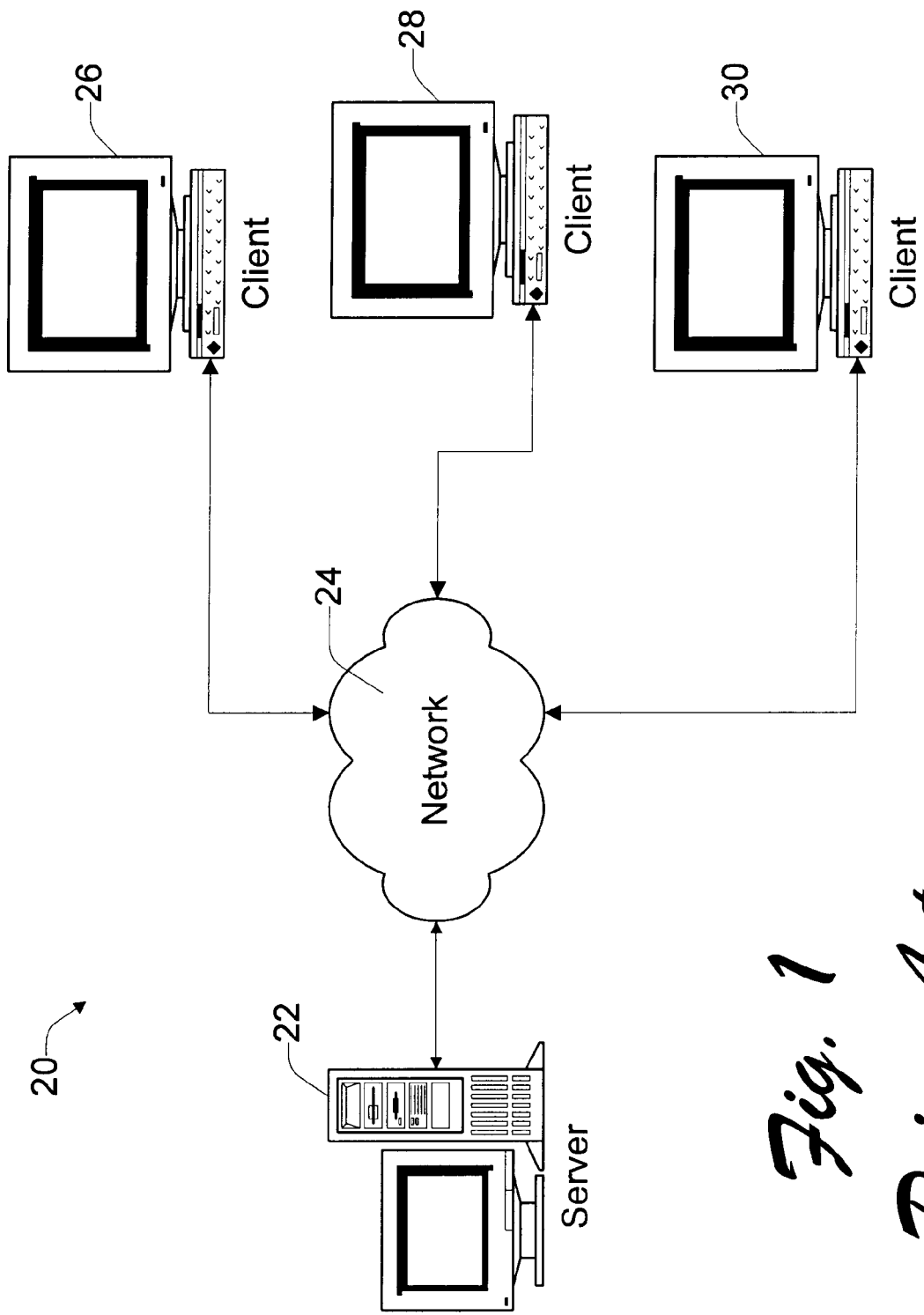
FIG. 1 is a diagrammatic illustration of a computer network used to implement a distributed authentication system according to an aspect of this invention.

FIG. 1 shows a distributed computer network system 20 having a server 22 connected via a network 24 to one or more remotely distributed clients, as represented by clients 26, 28, and 30. The computer network system 20 is representative of many different implementations, including conventional data networks and entertainment distribution networks. As representative examples, the computer network system 20 might be a local area network (LAN), a wide area network (WAN), or an intranet. In such implementations, the server 22 represents a network server or cluster of servers, the network 24 represents an Ethernet network, an ATM (Asynchronous Transfer Mode) network, or the like, and the clients 26–30 represent workstations or personal computers.

The network system 20 might alternately be an Internet system in which the network 24 is the Internet. In this case, the server 22 represents a content provider, a Web site, or an Internet service provider and the clients 26–30 are terminal computing units (e.g., personal computers or laptops) which can access resources on the Internet.

As still another implementation, the network system 20 might be an entertainment network system, such as an interactive television system or a broadcast entertainment system. The server 22 represents a headend server or broadcast station, the network 24 represents a distribution network (cable, RF, satellite, etc.), and the clients 26–30 represent televisions, set-top boxes, broadcast enabled personal computers, or the like.

Other implementations of the computer network system 20 can also be configured. For purposes of discussion, the network system 20 is described generically as a server and clients interconnected via a network.

The computer network system 20 implements a cryptographic authentication system (CAS) which enables a user to log onto any one of the clients 26–30 and regenerate his/her public key pair at that client. The user can authenticate messages, or perform other cryptographic functions (encryption, decryption, etc.), from that client as if the client was the user's personal machine. The authentication system allows the user the freedom to roam from client to client and perform such key-based tasks without carrying a portable key device or without maintaining a key bank at the server.

Figure 2:
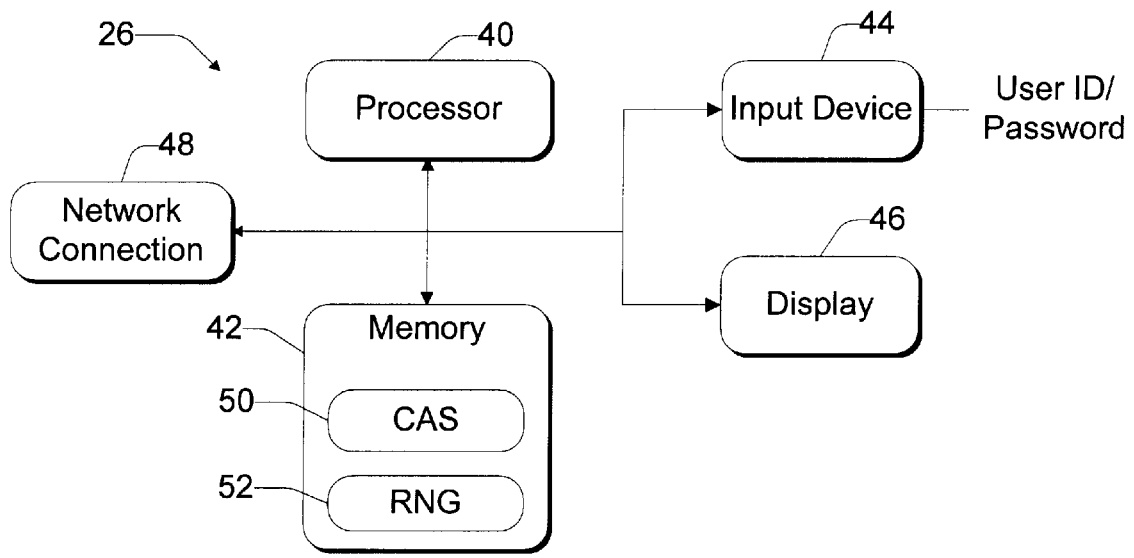
FIG. 2 is a block diagram of a client computer.

Components of the authentication system are executed at the server 22 and at the clients 26–30. FIG. 2 shows a client 26 in more detail. Client 26 has a processor 40, a memory 42 (e.g., RAM, ROM, hard disk, floppy disk, compact disk, etc.), an input device 44 (e.g., keyboard, mouse, touch screen, track ball, touch pad, etc.), a display 46, and a network connection 48 (e.g., modem, network card, etc.). The client 26 can be implemented as a workstation, desktop PC, portable computer, television, set-top box, kiosk, banking ATM, or other form of computing unit.

The client 26 has a cryptographic authentication system (CAS) application 50 stored in memory 42 and executable on the processor 40. The CAS application 50 is part of the authentication system. When loaded and operable on the processor 40, the CAS application 50 presents a user interface window which prompts the user to enter a user ID (e.g., user name, user PIN, user serial number, etc.) and a user password which is unique and preferably secret to the user. Additional or different user-identifying information may alternatively be entered by the user and employed within the CAS application. The user enters the user-identifying information via the input device 44. As an alternative, the CAS application 50 may rely on the user-identifying information entered by the user during normal log on procedures, rather than presenting its own user interface window. The CAS application 50 has cryptographic services which enables it to perform various cryptographic functions, such as hashing, encryption, decryption, digital signing, and signature verification.

The client 26 also has a random number generator (RNG) 52 which is used to generate keying material, as is described below in more detail. The random number generator 52 can be incorporated as part of the CAS application, or as a separate component. The random number generator 52 is shown as a software program, such as a dynamically linked library (DLL), that can be executed on the processor 40; but, it can also be implemented in hardware.

Figure 3:
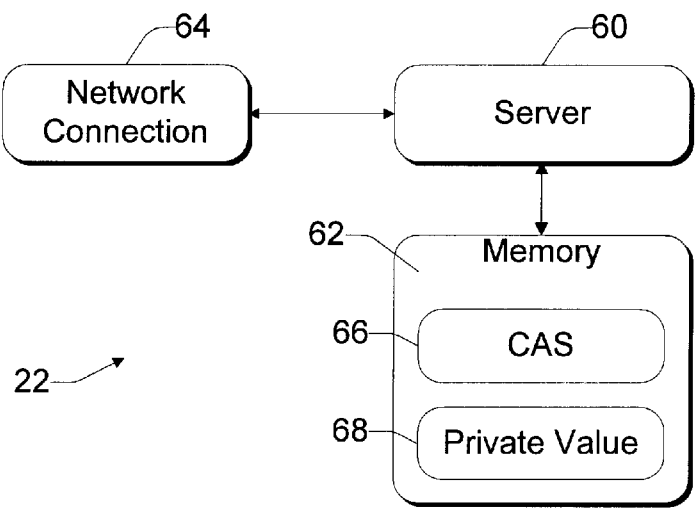
FIG. 3 is a block diagram of a server computer.

FIG. 3 shows an example implementation of the server 22. It includes a server processor 60, a memory 62 (e.g., disk drives, disk array, database, etc.), and a network connection 64. The server can be implemented as a mainframe computer, a computer configured to run a UNIX operating system, or a computer configured to run an NT operating system from Microsoft Corporation.

The server 22 has a server-based cryptographic authentication system (CAS) application 66 stored in memory 62 and executable on the processor 60. The CAS application 66 is part of the authentication system and has cryptographic services which perform various cryptographic functions. The server 22 also has a private value 68 which is secret and confidential to the server. The server 22 is presumed to be trusted on the network, and employs physical forms of security to prevent theft or discovery of the private value 68. Techniques for keeping this private value 68 secure are well-known and are not discussed in this disclosure.

Figure 4:
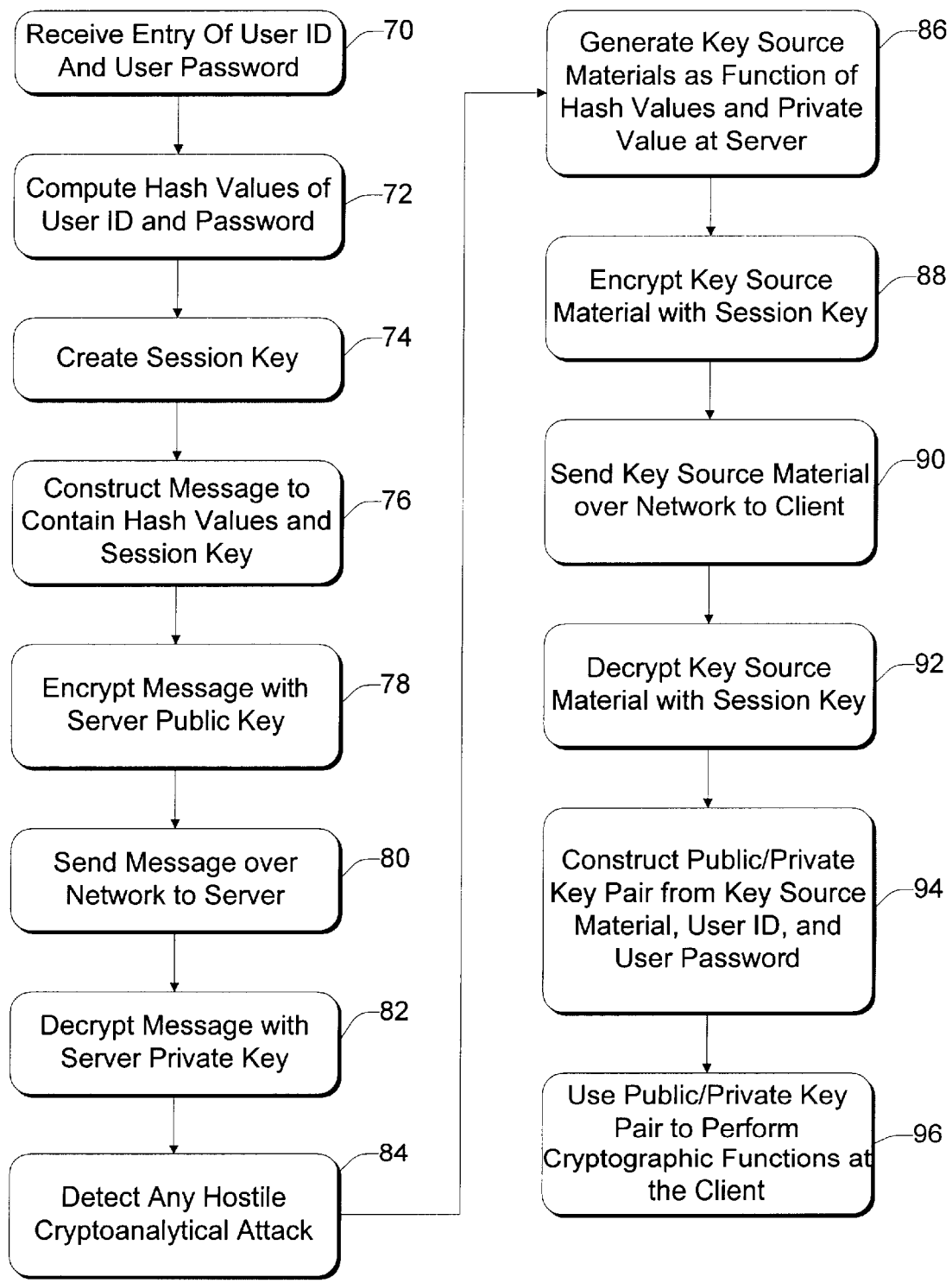
FIG. 4 is a flow diagram showing steps in a method for operating the authentication system.

FIG. 4 shows steps in a method for operating a cryptographic authentication system on a distributed network system. This method is described with reference to the client-server framework of FIGS. 1–3. The steps illustrated in FIG. 4 are preferably implemented in software which is executed on the client and server within the CAS applications 50 and 66.

Suppose a user wishes to authenticate a message from a client computer that is not his/her own designated client computer. For instance, the user might be physically away from his/her own computer, or his/her computer might be temporarily inoperable. The user initiates a log on sequence at the client and enters user-identifying information, such as a user ID and a password, at the input device 44. The user ID and other information may be stored on the system in association with the password. Hence, the log on procedure may involve only entry of the user's password. Next, the user initiates the CAS application 50 on the client, either directly or indirectly as a called application supporting another application. The CAS application 50 is loaded and executed on the client processor 40.

At step 70 in FIG. 4, the client-based CAS application 50 receives the user ID and password entered by the user. Presumably, the user has sole control and knowledge of his/her own password, and hence the password is considered to be unique to the user. At step 72, the client 26 computes one or more one-way hash functions of the user ID and password P. As one example implementation, the client 26 computes a first one-way hash function of the user ID to produce a first hash value H(ID) and a second one-way hash function of the user ID concatenated with the user password P to produce a second hash value H(ID/P). Example hash functions that can be used include SHA (Security Hash Algorithm), MD4, and MD5. It is noted, however, that mathematical functions other than one-way hash functions can be used.

At step 74 in FIG. 4, the client 26 creates a random session key SK which will be used by the server to encrypt information being returned to the client. As an example, this session key can be constructed for use in a symmetric cipher, as is described below in more detail. The client 26 constructs a message M to contain a concatenated string of the first hash value H(ID), the second hash value H(ID/P), and the session key SK (step 76 in FIG. 4). The message can be represented as follows:

$$M = H(ID) | H(ID/P) | SK$$

The client 26 encrypts the message M using a conventional public key protocol (step 78 in FIG. 4). A public key system is built on an asymmetric key cipher involving two separate cryptographic keys, a first key to manipulate data to an altered form and a second key to convert the altered data back to its original form. The keys are based upon a mathematical relationship in which one key cannot be calculated (at least, not in any reasonable amount of time) from the other key. One of the keys, known as the "public key," is freely distributed to other participants and can be listed in public books or posted on electronic bulletin boards. The other key, known as the "private key," is maintained in confidence by the participant. An example asymmetric cipher is the well-known RSA cryptographic algorithm named for its creators Rivest, Shamir, and Adleman.

The client 26 encrypts the message M using the server's public key "ServerPubKey," which is well known or easily available on the network, according to an encryption function E as follows:

$$E[M]_{ServerPubKey} = M.enc$$

At step 80, the client 26 sends the encrypted message over the network 24 to the server 22. The server 22 decrypts the message using its own private key "ServerPriKey," which is secret to the server, according to the decryption function D as follows:

$$D[M.enc]_{ServerPriKey} = M$$

This decryption recovers the original message M. The use of public and private keys ensures two results. First, only the holder of the private key (i.e., the server) can decrypt a message that is encrypted with the corresponding public key. Second, if a party decrypts a message using the holder's corresponding public key, that party can be assured that the message was encrypted by the holder's private key and thus presumably originated from the holder.

At step 84 in FIG. 4, the server 22 employs one or more policies to detect if the user ID or password is being subject to any hostile cryptoanalytical attack. For instance, an impostor operating on a client might attempt to guess a user's ID and password and submit this information to the server 22. These dictionary attacks can be carried out rapidly and systematically with a computer, but each guess requires an on-line submission to the server. Various policies can be established at the server to determine when an impostor is conducting a dictionary attack by virtue of the repeated submission of guesses. For instance, one policy might be to accept a request for the hash value H(ID) every five seconds. A legitimate user is presumed to only need his/her authentication keys every so often, and not sooner than once every five seconds. Given the shear volume of possible values for a user ID and password and the imposed five second delay between tries, the impostor's efforts are effectively thwarted or at least frustrated by the long duration required to conduct a thorough on-line dictionary attack. Other policies may also be used.

If the server 22 determines that an impostor is attempting to compromise the authentication system, the server 22 denies the client's request. The server places the user ID and password on an invalid list and posts a warning to alert personnel that the user ID and password are being attacked.

If the server 22 determines that the request from the client is legitimate and that no attack is taking place, the server 22 generates key source material to be passed back to the client for creation of the user's personal keys (step 86 in FIG. 4). The CAS application 66 at the server 22 generates the key source material as a function of the user ID and password. In one implementation, the CAS application 66 generates an n-bit key source value S which is a function of the two hash values H(ID) and H(ID/P) received in the message M from the client, and a private value PV that is confidential to the server. This is represented as follows:

$$S = f[H(ID), H(ID/P), PV]$$

The function $f$ is preferably a one-way function, such as SHA, MD4, MD5, etc., although other functions may be used.

At step 88 in FIG. 4, the server 22 encrypts the key source material S with the session key SK received in the message M from the client. This encryption step employs a symmetric cipher of a private key system. In a symmetric cipher, the key used for both encryption and decryption can be calculated from one another, and in many cases like this one, the encryption key and decryption key are the same. The symmetric key must be known to both the sender and receiver, but otherwise kept secret. Once the symmetric key is divulged, any party (including an eavesdropper) can encrypt or decrypt messages. Example symmetric ciphers are the DES (Data Encryption Standard) encryption algorithm and the RC4 algorithm.

The session key SK is originally generated by the client and presumed to be secret to the client. The session key SK is passed to the server in a secured form using the servers public/private key pair. Accordingly, the session key SK is considered to be secret to only the server and client. Encryption of the key source material S using the session key SK is represented as follows:

$$E[S]_{SK} = S.enc$$

The server 22 sends the encrypted key source material S over the network 24 to the client 26 (step 90 in FIG. 4). At step 92, the client 26 decrypts the package using the session key SK to recover the key source material, as follows:

$$D[S.enc]_{SK} = S$$

After the key source material is decrypted, the client destroys the session key SK.

At step 94 in FIG. 4, the client-based CAS application 50 constructs a public/private key pair which is unique to the user from the user-identifying information, such as the user ID and user password, and the key source material S received from the server. In one implementation, the CAS application 50 passes the hash value H(ID), the hash value H(ID/P), the raw password P, and the key source material S through a random number generator 52 to produce keying material used to recover a private key of the public/private key pair. These four values—H(ID), H(ID/P), P, S—serve as the seed for the random number generator 52 to produce two prime numbers p and q which are used in an RSA public key system to generate a private key. The public key can be derived from the private key. The process by which the random number generator produces the prime numbers p and q is well known in the art and is not described herein.

The client is thereby able to regenerate the public/private key pair for the user. Using the public/private key pair, the user can perform cryptographic functions at the client (step 96 in FIG. 4). For instance, the user can digitally sign messages or encrypt/decrypt messages using the public/private key pair. As a result, the user effectively personalizes the client through the log on process to enable the client to perform cryptographic functions on behalf of the user, even though the client is not the user's designated machine. The user can subsequently move to another client on the network and regenerate his/her personal key pair by simply entering user-identifying information on the new client.

The authentication system is advantageous over prior art systems because it enables users to roam from client to client without having to carry a smart card or other key transport. Another advantage is that the distributed authentication system does not require the server to store all private keys.

The system is secure because only the user knows his/her own password and this password is not required to be stored on any machine. Even the trusted authentication server does not know the user's password since it receives only a hash value of the password. Thus, the authentication server cannot secretly authenticate messages on behalf of the user. Additionally, the password P and key source material S are exchanged between the client and server in an encrypted form. An eavesdropper is prevented from intercepting the transmission and discovering the password P and source material S in their raw forms.

An attacker can attempt to guess a user's password, but will be unable to generate the user's public/private key pair without interaction with the server, and namely, without receipt of the key source material S. Since the attacker must submit each guess to the server, the detection policies implemented at the server to detect cryptoanalytical attacks dissuade an attacker from trying a systematic dictionary attack on the user's password.

In another less preferred implementation, the client can be configured to generate a public/private key pair as a function of only the user password and user ID. In theory, if passwords are well chosen, the authentication system can use entropy in the password to generate the user private key. For instance, the client passes the hash value H(ID), the hash value H(ID/P), and the password P through the random number generator 52 to create the prime numbers p and q.

This implementation avoids interaction with the server and as a result, does not use the key source material S. The implementation is beneficial over prior art systems because it eliminates use of key transports (e.g., smart cards) and centralized key banks. Unfortunately, most passwords are chosen poorly and do not provide the needed amount of entropy. The implementation is thus less preferred because the system is open to off-line dictionary attacks. An attacker can systematically try different passwords using an off-line computer without having to submit requests to the server.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for operating an authentication system on a distributed network having a client and a server, comprising the following steps:

constructing a message at the client to include user-identifying information which is unique to a user and a session key;

encrypting the message at the client;

sending the encrypted message to the server;

decrypting the encrypted message at the server;

generating, at the server, key source material as a function of the user-identifying information received in the message;

encrypting the key source material at the server using the session key;

sending the encrypted key source material to the client;

decrypting the encrypted key source material at the client using the session key; and constructing a public/private key pair unique to the user from the user-identifying information and the key source material.

2. A method as recited in claim 1, wherein the steps of encrypting and decrypting the message are performed using a public key protocol involving a public/private key pair unique to the server.

3. A method as recited in claim 1, further comprising the following steps:
   computing a function of the user-identifying information; and
   constructing the message to include the function of the user-identifying information.

4. A method as recited in claim 1, further comprising the following steps:
   computing a one-way hash function of the user-identifying information to produce a hash value; and
   constructing the message to include the hash value representative of the user-identifying information.

5. A method as recited in claim 1, wherein the user-identifying information comprises a user ID and a user password.

6. A method as recited in claim 5, further comprising the step of constructing the message to include a one-way hash function of the user ID and the user password.

7. A method as recited in claim 5, further comprising the step of generating key source material that is a function of the user ID, the user password, and a private value that is confidential to the server.

8. A method as recited in claim 1, further comprising the step of generating key source material that is a function of the user-identifying information and a private value that is confidential to the server.

9. A method as recited in claim 1, wherein the step of constructing the public/private key pair comprises passing the user-identifying information and the key source material through a random number generator to create the public/private key pair.

10. A method as recited in claim 1, wherein the user-identifying information comprises a user ID and a user password, further comprising the step of passing the user ID, the user password, and the key source material through a random number generator to create the public/private key pair.

11. A method as recited in claim 1, wherein the user-identifying information comprises a user ID and a user password, further comprising the following steps:
    concatenating the user ID and the user password;
    hashing the user ID to produce a hash value H(ID);
    hashing the concatenated user ID and user password to produce a hash value H(ID/P); and
    passing the hash value H(ID), the hash value H(ID/P), the user password, and the key source material through a random number generator to create the public/private key pair.

12. A method as recited in claim 1, further comprising the step of using the public/private key pair to perform cryptographic functions from the client.

13. A method as recited in claim 1, further comprising the step of detecting at the server whether the user-identifying information is subject to cryptoanalytical attack.

14. Computer-readable media having computer-executable instructions executable at the client and the server for performing the steps of the method as recited in claim 1.

15. A method for operating an authentication system on a distributed network having a client and a server, comprising the following steps:
    generating a session key SK at the client;
    computing a hash of a user ID at the client to produce a hash value H(ID);
    computing a hash of the user ID and a user password P at the client to produce a hash value H(ID/P);
    constructing a message M at the client to contain the hash value H(ID), the hash value H(ID/P), and the session key SK;
    encrypting the message M at the client using a public key unique to the server;
    sending the encrypted message to the server;
    decrypting the encrypted message at the server using a private key unique to the server to recover the message M;
    generating, at the server, key source material S as a function of the hash value H(ID), the hash value H(ID/P), and a private value that is confidential to the server;
    encrypting the key source material S at the server using the session key SK;
    sending the encrypted key source material to the client;
    decrypting the encrypted key source material at the client using the session key SK to recover the key source material S; and
    constructing a public/private key pair unique to the user from the user ID, the user password, and the key source material.

16. A method as recited in claim 15, wherein the step of constructing the public/private key pair comprises generating the key pair from a random number generator which uses as a base source of entropy the user ID, the user password P, and the key source material S.

17. A method as recited in claim 15, further comprising the step of passing the hash value H(ID), the hash value H(ID/P), the user password P, and the key source material S through a random number generator to create the public/private key pair.

18. A method as recited in claim 15, further comprising the step of using the public/private key pair to perform cryptographic functions from the client.

19. A method as recited in claim 15, further comprising the step of detecting at the server whether the hash value H(ID) and the hash value H(ID/P) are subject to cryptoanalytical attack.

20. Computer-readable media having computer-executable instructions executable at the client and the server for performing the steps of the method as recited in claim 15.

21. A method for operating an authentication system on a distributed network having multiple clients and a server, comprising the following steps:
    enabling a user to enter user-identifying information on one of the clients;
    sending a message containing the user-identifying information to the server;
    generating, at the server, key source material as a function of the user-identifying information received from the client;
    sending the key source material to the client; and
    constructing, at the client, a public/private key pair unique to the user from the user-identifying information and the key source material.

22. A method as recited in claim 21, further comprising the following steps:
    encrypting the message at the client;
    sending the encrypted message from the client to the server; and
    decrypting the message at the server.

23. A method as recited in claim 21, further comprising the following steps:
   computing a function of the user-identifying information; and
   constructing the message to include the function of the user-identifying information.

24. A method as recited in claim 21, further comprising the following steps:
   computing a one-way hash function of the user-identifying information to produce a hash value; and
   constructing the message to include the hash value representative of the user-identifying information.

25. A method as recited in claim 21, wherein the user-identifying information comprises a user ID and a user password.

26. A method as recited in claim 25, further comprising the step of constructing the message to include a one-way hash function of the user ID and the user password.

27. A method as recited in claim 25, further comprising the step of generating key source material that is a function of the user ID, the user password, and a private value that is confidential to the server.

28. A method as recited in claim 21, further comprising the step of generating key source material that is a function of the user-identifying information and a private value that is confidential to the server.

29. A method as recited in claim 21, wherein the step of constructing the public/private key pair comprises passing the user-identifying information and the key source material through a random number generator to create the public/private key pair.

30. A method as recited in claim 21, wherein the user-identifying information comprises a user ID and a user password, further comprising the step of passing the user ID, the user password, and the key source material through a random number generator to create the public/private key pair.

31. A method as recited in claim 21, wherein the user-identifying information comprises a user ID and a user password P, further comprising the following steps:
   concatenating the user ID and the user password;
   hashing the user ID to produce a hash value H(ID);
   hashing the concatenated user ID and user password to produce a hash value H(ID/P); and
   passing the hash value H(ID), the hash value H(ID/P), the user password, and the key source material through a random number generator to create the public/private key pair.

32. A method as recited in claim 21, further comprising the step of using public/private key pair to perform cryptographic functions from the client.

33. A method as recited in claim 21, further comprising the step of detecting at the server whether the user-identifying information is subject to cryptoanalytical attack.

34. In an authentication system on a distributed network having multiple clients and a server, a method for creating key source material in response to submission of user-identifying information unique to a user from a client, the key source material being useable to construct a key unique to the user at the requesting client, comprising the following steps:
   receiving user-identifying information from the client;
   detecting whether the user-identifying information is subject to cryptoanalytical attack; and
   generating key source material as a function of the user-identifying information received from the client and a private value that is confidential to the server if the user-identifying information has not been subject to a cryptoanalytical attack.

35. A method as recited in claim 34, wherein the user-identifying formation comprises a user ID and a user password, further comprising generating the key source material as a function of the user ID, the user password, and the private value.

36. A method as recited in claim 34, wherein the user-identifying information comprises a result of a mathematical function of a user ID and a user password, further comprising generating the key source material as a second mathematical function of the result and the private value.

37. A method as recited in claim 34, wherein the user-identifying information comprises at least one hash value based on a user ID and a user password, further comprising generating the key source material as a function of the hash value and the private value.

38. A method as recited in claim 34, further comprising the following steps:
   encrypting the key source material; and
   sending the encrypted key source material to the client.

39. A computer programmed to perform the steps recited in the method of claim 34.

40. A computer-readable medium having computer-executable instructions for performing the steps of the method as recited in claim 34.

41. In an authentication system on a distributed network having multiple clients and a server, a method comprising the following steps:
   receiving key source material from the server, the key source material being a function of user-identifying information entered by the user at the particular client;
   constructing a public/private key pair unique to the user from the user-identifying information and the key source material.

42. A method as recited in claim 41, wherein the step of constructing the public/private key pair comprises passing the user-identifying information and the key source material through a random number generator to create the public/private key pair.

43. A method as recited in claim 41, wherein the user-identifying information comprises a user ID and a user password and the step of constructing comprises passing the user ID, the user password, and the key source material through a random number generator to create the public/private key pair.

44. A method as recited in claim 41, wherein the user-identifying information comprises a user ID and a user password, further comprising the following steps:
   concatenating the user ID and the user password;
   hashing the user ID to produce a hash value H(ID);
   hashing the concatenated user ID and user password to produce a hash value H(ID/P); and
   passing the hash value H(ID), the hash value H(ID/P), the user password, and the key source material through a random number generator to create the public/private key pair.

45. A method as recited in claim 41, further comprising the step of performing cryptographic functions at the client using the public/private key pair.

46. A computer programmed to perform the steps recited in the method of claim 41.

47. A computer-readable medium having computer-executable instructions for performing the steps of the method as recited in claim 41.

48. In an authentication system on a network having multiple clients and a server, a method for generating a key unique to a user at a particular client, comprising the following steps:

receiving user-identifying information entered by the user at the particular client;

computing a one-way function of the user-identifying information to produce a hash value; and constructing a public/private key pair unique to the user by passing the hash value through a random number generator.

49. A method as recited in claim 48, wherein the constructing step comprises passing the hash value and the user-identifying information through the random number generator.

50. A computer programmed to perform the steps recited in the method of claim 48.

51. A computer-readable medium having computer-executable instructions for performing the steps of the method as recited in claim 48.

52. In an authentication system on a distributed network having multiple clients and a server, computer-readable media having computer-executable instructions executable at the client and the server for performing the following steps;

enabling a user to enter user-identifying information on one of the clients;

sending user-identifying information from the client to the server;

generating, at the server, key source material as a function of the user-identifying information;

sending the key source material from the server to the client; and constructing, at the client, a public/private key pair unique to the user from the user-identifying information and the key source material.

53. An authentication system for a distributed network, comprising:

at least one client coupled to the network;

a server coupled to the network;

the client being programmed to receive entry of user-identifying information from a user, to create a message containing the user-identifying information, and to send the message over the network to the server;

the server being programmed to generate key source material as a function of the user-identifying information received in the message from the client and to send the key source material back over the network to the client; and the client being further programmed to construct a public/private key pair unique to the user from the user-identifying information and the key source material.

54. An authentication system as recited in claim 53, wherein the client encrypts the message prior to sending the message over the network.

55. An authentication system as recited in claim 53, wherein:

the message includes a session key; and the server being programmed to generate key source material as a function of the user-identifying information further comprises the server being programmed to generate key source material as a function of the user-identifying information and the session key.

56. An authentication system as recited in claim 53, wherein the message contains data computed as a function of the user-identifying information.

57. An authentication system as recited in claim 53, wherein the client is programmed to compute a one-way hash function of the user-identifying information to produce a hash value and to include the hash value as part of the message.

58. An authentication system as recited in claim 53, wherein the user-identifying information comprises a user ID and a user password.

59. An authentication system as recited in claim 53, wherein the server generates the key source material as a function of the user-identifying information and a private value that is confidential to the server.

60. An authentication system as recited in claim 53, wherein:

the user-identifying information comprises a user ID and a user password;

the client is programmed to compute at least one hash value involving the user ID and the user password; and the server generates the key source material as a function of the hash value and a private value that is confidential to the server.

61. An authentication system as recited in claim 53, wherein the client includes a random number generator to construct the public/private key pair from the user-identifying information and the key source material.

62. An authentication system as recited in claim 53, wherein the server detects whether the user-identifying information is subject to cryptoanalytical attack.

* * * * *

UNITED STATES PATENT AND TRADEMARK OFFICE
CERTIFICATE OF CORRECTION

PATENT NO.   : 6,230,269 B1                                        Page 1 of 1
DATED        : May 8, 2001
INVENTOR(S)  : Terence R. Spies et al.

It is certified that error appears in the above-identified patent and that said Letters Patent is hereby corrected as shown below:

Column 11,
Line 51, after "using" insert -- the --.

Column 12,
Line 5, replace "formation" with -- information --.

Signed and Sealed this

Nineteenth Day of February, 2002

Attest:

JAMES E. ROGAN
*Attesting Officer*         *Director of the United States Patent and Trademark Office*